Nov. 26, 1968 　　　L. W. PARKER　　　3,413,503
AXIAL AIRGAP MOTORS
Filed Jan. 13, 1966

INVENTOR
Louis W. Parker

BY

ATTORNEYS

United States Patent Office 3,413,503
Patented Nov. 26, 1968

3,413,503
AXIAL AIRGAP MOTORS
Louis W. Parker, 2040 N. Dixie Highway,
Fort Lauderdale, Fla. 33305
Filed Jan. 13, 1966, Ser. No. 520,340
10 Claims. (Cl. 310—268)

ABSTRACT OF THE DISCLOSURE

An axial air gap machine is provided with axially movable rotors and stators. Spring means urge the rotors and stators toward one another, and thrust bearing means hold the rotors and stators in spaced relation against the magnetic attraction between them as well as the force of the spring means.

---

Figure 1:
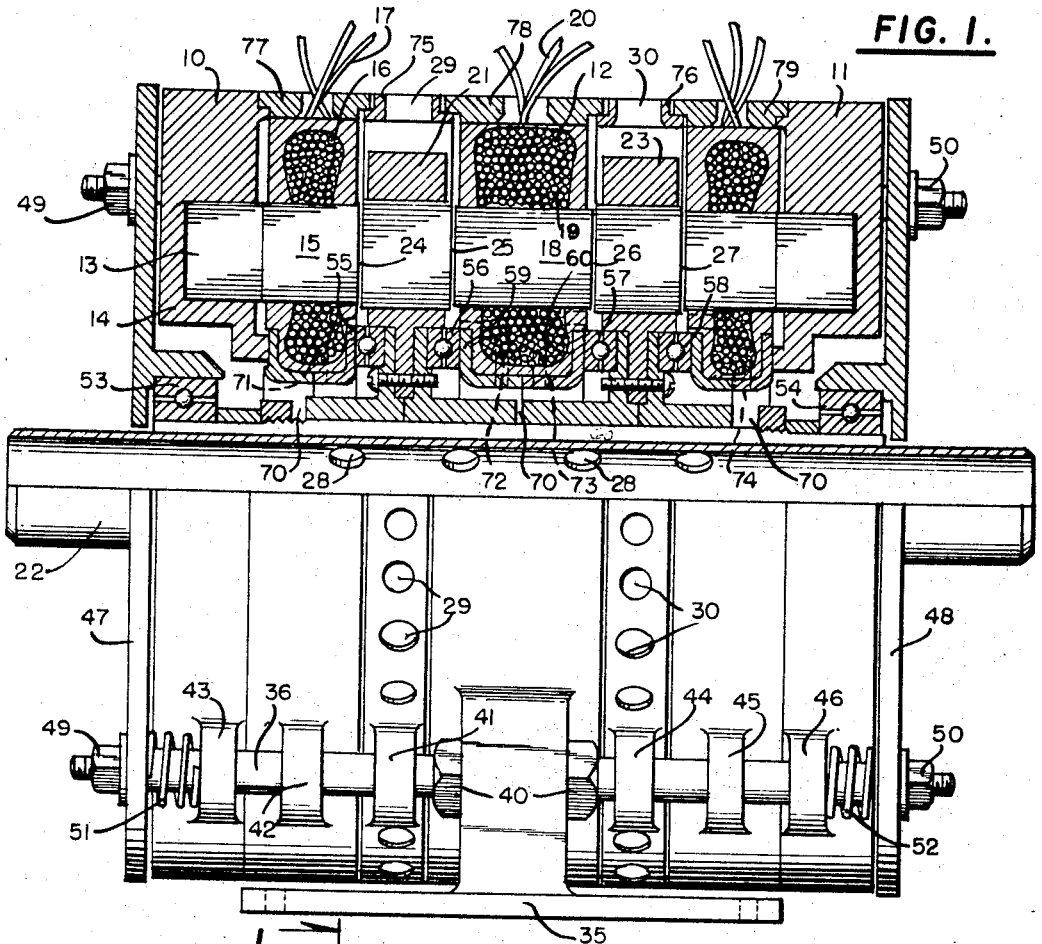

The present invention relates to dynamo-electric machines, and more particularly to electric motors of the axial airgap type; and is especially concerned with machines of this general type wherein the stator and rotor sections are supported relative to one another in a unique manner operative to facilitate the adjustment of desired airgaps present between the rotor and stator sections.

The mechanical construction and operational principles of axial airgap motors have been described in my prior U.S. Patent No. 2,479,589 issued Aug. 23, 1949 for "Rotor for Axial Air Gap Motors and Generators," and in my prior U.S. Patent No. 2,734,140 issued Feb. 7, 1956 for "Axial Airgap Motors and Generators." The disclosures of these prior patents are incorporated herein by reference, and the detailed construction and operation of such machines will accordingly not further be described herein. As a general proposition, however, it should be noted that such machines normally comprise a plurality of stator sections and a plurality of rotor sections disposed in interleaved relation to one another, with the stator and rotor sections each including magnetic lamination stacks so disposed relative to one another and relative to a central shaft as to provide a flux path extending through the machine in direction generally parallel to the direction of elongation of said central shaft. The several rotor and stator sections are spaced from one another in the axial direction of the machine to provide airgaps between said rotor and stator sections; and flux passing from one to another of said rotor and stator sections traverses these axial airgaps.

In order to achieve desired operating characteristics, and consistency in such characteristics, for the motors in question, it is important that the several airgaps between the rotor and stator sections be of desired predetermined dimensions. In the construction of an axial airgap motor, therefore, considerable care has been required to assure that the rotor and stator sections are properly positioned relative to one another, and properly adjusted in position, so that the airgaps are accurately dimensioned. This requirement for adjustment of the rotor and stator positions has, in many instances, caused much difficulty, particularly when the airgaps between the stator and rotor sections are to be made small. This typically is caused by the fact that the adjustment of some parts of the machine normally affect the adjustment of other parts, so that relocation of certain of the parts of the machine relative to one another to effect a particular airgap dimension in some one part of the machine normally results in a change in the adjustment or airgap dimensions in other parts of the machine. The difficulty in adjustment increases very seriously with a moderate increase in the number of stators and rotors provided in any particular machine.

The present invention, recognizing these characteristics of known axial airgap machines, is accordingly concerned with an improved such machine having the parts thereof so arranged that airgap adjustments are rendered substantially independent of one another. In addition, as will appear, the particular construction selected in the present invention is such as to make most adjustments semi-automatic so that once the various parts of the machine are assembled, the desired airgaps between these several parts are achieved automatically, without requiring any significant adjustment procedures.

It is accordingly an object of the present invention to provide an improved axial airgap machine, particularly an improved axial airgap motor, so constructed as to eliminate difficulties in airgap adjustment which have characterized prior such machines.

Another object of the present invention resides in the provision of an axial airgap motor having rotor and stator sections so associated with a mounting structure as to achieve a semi-automatic adjustment in the airgaps between the several machine parts.

A further object of the present invention resides in the provision of an axial airgap motor construction having rotor and stator sections positioned for movement relative to one another in an axial direction, and so arranged within the overall machine as to permit more ready adjustment of airgaps than has been possible heretofore.

Still another object of the present invention resides in the provision of an axial airgap motor having rotor and stator sections associated with an improved mounting arrangement operative to cause the rotor and stator sections to assume desired positions relative to one another when the motor is in operation, so that desired accurate airgap dimensions are present between the rotor and stator sections during motor operation even if such desired airgap dimensions are inaccurate when the motor is at rest.

Another object of the present invention resides in the provision of an axial airgap motor arrangement wherein the adjustment of any particular airgap is rendered substantially independent of the dimensions of any other airgap present in the machine, and wherein all airgaps within the machine may be readily adjusted to any desired dimension, including very small spacings, without regard to the number of stators and/or rotors present in the machine.

In providing for the foregoing objects and advantages, the present invention contemplates the provision of an axial airgap machine having rotor and stator sections constructed generally in accordance with the teachings of my prior patents identified above. One of the machine's stators, preferably a centrally located stator, supports a frame structure upon which the other stators can slide axially. The rotor sections, which are disposed between these movable stator sections, are also arranged so that they may slide axially on the machine shaft. The frame structure supported by the centrally located stator includes spring assemblies mounted in such manner as to tend to press the stators and rotors together. In addition, thrust bearings, preferably of the ball type, are disposed between the rotors and stators of the machine to prevent adjacent rotors and stators from touching one another while, at the same time, accurately guaging the space which exists between such adjacent rotor and stator sections.

The spring members provided in the aforementioned frame structure tend to draw stators in the overall machine toward the centrally disposed stator, and, at the same time, tend to re-position the intervening rotor sections relative to the stator sections by causing said rotor sections to slide to axial directions along the motor shaft until all of the rotor and stator sections assume positions relative to one another determined by the dimensions of the aforementioned thrust bearings. When the motor is operating, the magnetic attraction between the stators and rotors tends to aid the force of the aforementioned spring members in pulling the stators and rotors together. Due to the considerable radius of the thrust bearings, the rotor and stator sections will be aligned parallel during operation of the machine, even if they are somewhat loose relative to one another when the machine is at rest.

Figure 2:
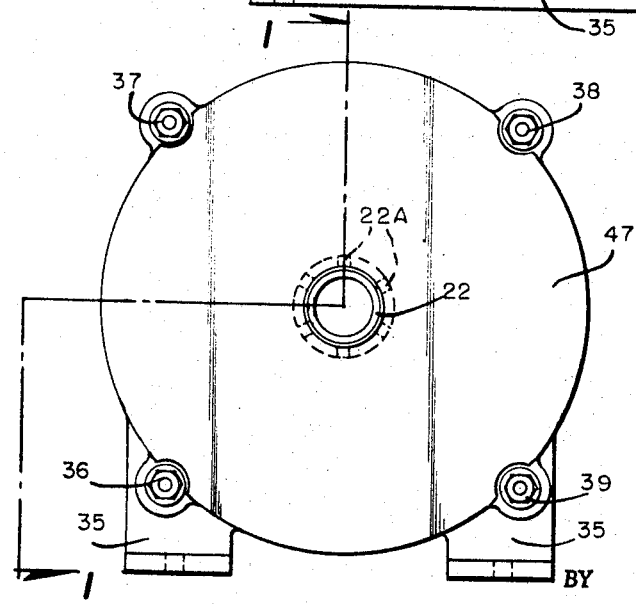

The foregoing objects, advantages, construction and operation of the present invention will become more readily apparent from the following description and accompanying drawings, in which:

FIGURE 1 is a side view, in partial section, of an axial air gap motor constructed in accordance with the present invention, said section being taken on line 1—1 of FIGURE 2; and FIGURE 2 is an end view of the motor shown in FIGURE 1.

Referring now to the figures, like numerals of which refer to like parts throughout, it will be seen that an axial air gap motor constructed in accordance with the present invention may comprise a pair of outer stator sections 10 and 11 and an interior stator section 12. The number of stators (and rotors), provided in a machine constructed in accordance with the present invention, may be varied; and the three stator/two rotor form of motor illustrated in the drawings is merely illustrative. End stator 10 includes a lamination ring 13 which may be supported in a non-magnetic material 14 such as cast aluminum, and said end stator 10 further includes a plurality of lamination stacks 15 associated with coil windings 16 having conductors 17 extending to an appropriate source of power. A similar arrangement is associated with the other end stator 11.

The central stator 12 includes a lamination stack 18 again associated with coil windings 19 and both conductors 20. Stacks of laminations 15, 18, etc., are disposed in a circular array, and are held in place by a hardened plastic material, as is described in my above-referenced U.S. patents.

A rotor 21 is positioned between stator sections 10 and 12 and is mounted for rotation along with a central shaft 22, which may be hollow. A further rotor section 23 is similarly mounted for rotation with shaft 22 at a position between stator sections 11 and 12. The rotor sections 21 and 23 can take the form described in my prior patents identified above, or, in the alternative, these rotor sections may take the form described in my prior copending application Ser. No. 487,548 filed Sept. 15, 1965 for "Improved Dynamo-Electric Machines, and Rotors Therefor." The several rotor and stator sections are spaced from one another to provide axial airgaps therebetween, e.g. airgaps 24, 25 between the opposing sides of rotor 21 and stators 10 and 12, and airgaps 26 and 27 between the opposing sides or rotor 23 and stators 12 and 11 respectively. Flux traverses these several airgaps 24 through 27 as it passes from one of the outer stators 10 or 11 to the other one thereof via the intervening central stator 12 and rotors 21 and 23.

During the rotation of rotor sections 21 and 23, air passes through hollow central shaft 22 and thence via orifices 28 to air spaces or plenums 70. From the plenums the air is conducted through pipes 71–74 to airgaps 24–27 between the rotors and stators. These pipes 71–74 are placed between coil windings and serve the purpose of permitting the air to bypass the thrust bearings 55–58, to be discussed. After reaching the airgaps 24–27, the air is expelled by centrifugal action to the periphery of rotors 21 and 23. Inasmuch as the airgaps 24–27 are rather small in size, most of the air is expelled through the radial gaps located between the stacks of laminations on both the rotors and stators. After this, the air leaves the motor through openings 29 and 30 provided in casings or rings 75 and 76 adjacent the peripheries of the several rotor sections.

Center stator 12 has an outer casing section which is equipped with mounting legs 35, and the entire motor is supported on said mounting legs 35 by center stator 12. Four elongated rods 36, 37, 38 and 39 pass through sleeves forming unitary portions of the exterior casing of stator section 12; and each of said rods 36–39 is held in place relative to stator 12 by means of nut members 40 (see FIGURE 1) engaging threaded portions of the rods adjacent opposing sides of the aforementioned sleeves. The four rods 36–39 pass slidably through other sleeve members formed at the exterior of the casing sections holding the various rotor and stator portions of the motor, e.g. the rod 36, as shown in FIGURE 1, passes through the sleeve portion 41 formed integrally with the external casing 75 or rotor section 21, passes through further sleeve sections 42 and 43 formed at the exterior of casing 77 of stator section 10, and passes through similar sleeve sections 44, 45 and 46 in the casings 76 and 79 associated respectively with rotor section 23 and with end stator 11. The outermost ends of the rods 36–39 hold end plates 47 and 48, being attached thereto by nuts 49 at one end, and by nuts 50 at the other end, in thread engagement with the outermost ends of said rods 36 through 39. Spring members such as 51 and 52 surround each of the rods 36 through 39 at positions adjacent the end plates 47 and 48, and said spring members bear upon the facing surfaces of sleeve members 43 and 46 thereby urging end stators 10 and 11 inwardly respectively with respect to end plates 47 and 48.

Ball bearings 53 and 54 are disposed between end plates 47 and 48 and the rotating shaft 22; and these bearings 53 and 54 accordingly provide support for all rotating portions of the motor. Further bearings, comprising thrust bearings 55, 56, 57 and 58 separate stators 10, 11 and 12 from rotors 21 and 23. The stator 12 is, moreover, provided with rings 59 and 60 functioning to take up the pressure caused by the increased pull of the magnetic field during operation of the motor. Rings 59 and 60 are made of two pieces in order to enable their placement on the coils before filling the empty spaces on the stators by the plastic material. A similar ring-type construction may be used on all of the stators.

It will be appreciated, from the structure described, that rotors 21 and 23 are adapted to move axially along shaft 22. More particularly, shaft 22 is grooved or splined axially so as to permit the rotors 21 and 23 to slide axially while in engagement with the shaft. This is illustrated as 22A on FIGURE 2. Moreover, the stators 10 and 11 can also slide axially along supporting rods 36–39 relative to central stator 12 which provides the ultimate support for all of the stator sections. The spring members such as 51 and 52 tend to urge end stators 10 and 11 inwardly, and this inward force is transferred through thrust bearings 55 and 58 to rotors 21 and 23 so that these rotors also tend to slide axially toward central stator 12. The actual dimensions of gaps 24, 25, 26 and 27 present between the several rotor and stator sections are accurately gauged by the thrust bearings 55–58.

When the motor is operating, the inward force exerted upon the various rotor and stator sections, relative to central stator 12, comprises a composite force exerted by springs such as 51 and 52, augmented by the inward pull of the magnetic field generated during motor operation. This composite force cooperating with the trust bearings 55 through 58, positions the several rotor and stator sections in accurately spaced relation to one another and, due to the considerable radius of the thrust bearings 55–58, also serves to align the rotor and stator sections substantially parallel to one another even if these several sections would tend to be rather loose when the motor is at rest.

It is to be noted that all the stators are surrounded by casing sections comprising individual rings 77, 78 and 79 which together compose the outside of the motor. Rings or casing sections 77, 78 and 79 are separated by rings 75 and 76, to leave spaces for the rotors. Adjacent ones of rings 75 through 79 overlap or telescope into one another for a short distance in order to help in fixing the locations of the stators while, at the same time, permitting the stators to move axially.

The actual dimensions of the airgaps between the rotor and stator sections become determined, by reason of the construction described, by the dimensions of the thrust bearings originally installed in the motor assembly. The difficult adjustment procedures which have been prevalent heretofore are accordingly obviated, and, moreover, the gap dimensions present between any two adjacent parts of the motor are rendered substantially independent of the gap dimensions which may exist at any particular time between other parts of the motor.

While I have thus described a preferred embodiment of the present invention, many variations will be suggested to those skilled in the art. It must therefore be understood that the foregoing description is meant to be illustrative only and should not be considered limitative of my invention, and all such variations and modifications as are in accord with the principles described are meant to fall within the scope of the intended claims.

Having thus described my invention, I claim:

1. An axial airgap dynamoelectric machine comprising a rotatable central shaft, rotor means surrounding said shaft and mounted for rotation with said shaft, stator means surrounding said shaft on opposing sides of said rotor means, means supporting said stator means for movement in directions parallel to said shaft, resilient means for urging said movable stator means toward the opposing sides of said rotor means, and thrust bearing means disposed between said stator means and the opposing sides of said rotor means for holding said stator means in accurately spaced relation to the opposing sides of said rotor means thereby to produce accurately gauged airgaps between said rotor means and said stator means.

2. The machine of claim 1 including housing means surrounding said rotor and stator means, said housing means including relatively movable sections movable with movements of said stator means whereby the dimensions of said housing vary with variations in the position of said stator means.

3. The machine of claim 1 wherein said stator means comprises at least one centrally located stator and at least two end stators axially spaced from said centrally located stator, said rotor means comprising at least two rotors positioned between said end stators and said centrally located stator respectively, said two rotors being mounted for slidable movement along said shaft.

4. The machine of claim 3 wherein said supporting means comprises a plurality of elongated rods fixedly attached to one of said stators, said rods extending in spaced generally parallel relation to said shaft in slidable engagement with the others of said stators.

5. The machine of claim 4 wherein said elongated rods are fixedly attached to said centrally located stator, said resilient means comprising helical spring means surrounding said rods and engaging portions of said end stators.

6. An axial airgap motor comprising a plurality of stator sections disposed in axially spaced relation to one another about a rotatable shaft, a frame structure attached to one of said stator sections, means slidably mounting the others of said stator sections on said frame structure for movement in axial directions along said shaft relative to said one stator section, a plurality of rotor sections slidably mounted on said shaft for rotation with said shaft, said plurality of rotor sections being positioned respectively between said spaced stator sections, thrust bearing means between adjacent ones of said rotor and stator sections for causing axial movements of said slidably mounted stator sections to effect related axial movements of said slidably mounted rotor sections while simultaneously maintaining adjacent ones of said rotor and stator sections in axially spaced relation to one another, and spring means carried by said frame for resiliently urging all of said rotor and stator sections toward one another.

7. The motor of claim 6 wherein said frame structure includes a pair of spaced end plates positioned outwardly of said rotor and stator sections, and main bearing means between said end plates and said shaft.

8. The motor of claim 6 wherein said frame structure comprises a pair of spaced end plates, a plurality of rods having their opposing ends attached to said spaced end plates respectively, a centrally located one of said stator sections being attached to a central portion of each of said rods at a position between said end plates, the others of said stator sections being positioned between said end plates and said centrally located stator section respectively, said other stator sections including sleeve members surrounding said rods for slidably mounting said other stator sections on said rods, and said spring means being located between said end plates and at least those stator sections which are closest to said end plates.

9. The motor of claim 6 wherein said stator sections include a centrally located stator, said frame structure being attached to said centrally located stator, and mounting leg means extending from said centrally located stator whereby said shaft, said frame, and said rotor and stator sections are all ultimately supported by said mounting leg means from said centrally located stator.

10. The motor of claim 6 wherein said motor includes a housing structure comprising a plurality of coaxial ring members disposed in side-by-side relation to one another, adjacent ones of said ring members including overlapping portions free to move axially relative to one another whereby axial movements of said stator sections effect related axial movements of the overlapping ring members of said housing structure.

References Cited

FOREIGN PATENTS 509,726   7/1939   Great Britain.

MILTON O. HIRSHFIELD, *Primary Examiner.*

R. W. TEMPLETON, *Assistant Examiner.*